(12) United States Patent
Cudzilo

(10) Patent No.: US 10,624,516 B2
(45) Date of Patent: Apr. 21, 2020

(54) DEVICE AND METHOD FOR DETECTING CLEANING WORK WHICH HAS BEEN PERFORMED

(71) Applicant: Martin Cudzilo, Frankfurt a.M. (DE)

(72) Inventor: Martin Cudzilo, Frankfurt a.M. (DE)

( * ) Notice: Subject to any disclaimer, the term of this patent is extended or adjusted under 35 U.S.C. 154(b) by 0 days.

(21) Appl. No.: 15/035,856

(22) PCT Filed: Sep. 5, 2015

(86) PCT No.: PCT/EP2015/070306
§ 371 (c)(1),
(2) Date: May 11, 2016

(87) PCT Pub. No.: WO2016/034732
PCT Pub. Date: Mar. 10, 2016

(65) Prior Publication Data
US 2017/0164802 A1     Jun. 15, 2017

(30) Foreign Application Priority Data

Sep. 5, 2014   (DE) .................. 10 2014 217 843

(51) Int. Cl.
*A47L 11/40*     (2006.01)
*G06F 3/01*      (2006.01)
(Continued)

(52) U.S. Cl.
CPC ............ *A47L 11/4011* (2013.01); *A47L 1/00* (2013.01); *A47L 9/2821* (2013.01);
(Continued)

(58) Field of Classification Search
CPC ... A47L 2201/06; G06F 3/0354; G06F 3/014; G06T 11/40
See application file for complete search history.

(56) References Cited

U.S. PATENT DOCUMENTS 5,485,645 A * 1/1996 Ohtsuki .................... A47L 1/02
15/103
6,667,592 B2 12/2003 Jacobs et al.
(Continued)

FOREIGN PATENT DOCUMENTS

DE         10319513 A1    5/2004
DE    20 2005 001702      6/2006
(Continued)

OTHER PUBLICATIONS

DE102013101496 Machine Translation (Year: 2013).*
(Continued)

*Primary Examiner* — Spencer E Bell
(74) *Attorney, Agent, or Firm* — The Marbury Law Group, PLLC

(57) ABSTRACT

The present invention relates to a device that is in particular detachable, connectable, or connected with a cleaning device, wherein the device comprises at least one sensor means in order to record the position of at least one cleaning area of a cleaning device, which area can be or is used for cleaning, at least one display device, and at least one data processing unit which interacts or can be made to interact functionally with the display device, and with the at least one sensor means, wherein the data processing device is configured and adapted to display at least one representation of at least one surface to be cleaned in at least one first color or without color and, based on a recorded change in the position of at least the cleaning area of the cleaning device, to display the surface to be cleaned in at least one second color or without superimposition of color.

13 Claims, 1 Drawing Sheet

Figure 1:
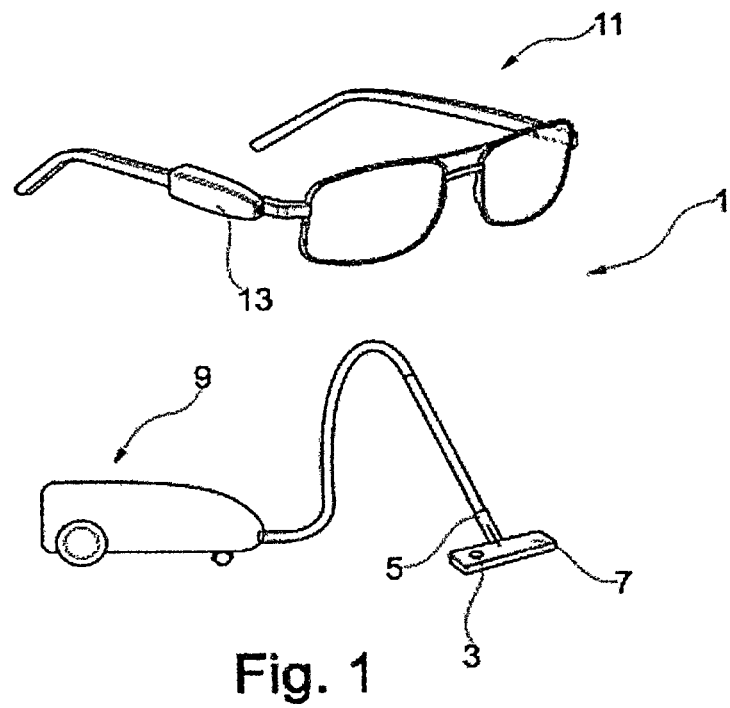

(51) Int. Cl.
  *G05B 19/042* (2006.01)
  *G02B 27/01* (2006.01)
  *G06F 9/451* (2018.01)
  *A47L 1/00* (2006.01)
  *A47L 9/28* (2006.01)
  *G05B 19/048* (2006.01)

(52) U.S. Cl.
  CPC ........... *A47L 9/2826* (2013.01); *A47L 9/2857* (2013.01); *A47L 11/40* (2013.01); *A47L 11/4008* (2013.01); *A47L 11/4086* (2013.01); *A47L 11/4088* (2013.01); *G02B 27/017* (2013.01); *G05B 19/042* (2013.01); *G05B 19/048* (2013.01); *G06F 3/011* (2013.01); *G06F 3/017* (2013.01); *G06F 9/453* (2018.02); *A47L 2201/06* (2013.01); *G02B 2027/014* (2013.01); *G02B 2027/0138* (2013.01); *G02B 2027/0141* (2013.01); *G02B 2027/0178* (2013.01); *G05B 2219/32014* (2013.01); *G05B 2219/45098* (2013.01)

(56) References Cited

U.S. PATENT DOCUMENTS

| | | |
|---|---|---|
| 2006/0171771 A1 | 8/2006 | Kruse |
| 2011/0264305 A1 | 10/2011 | Choe et al. |
| 2011/0316695 A1* | 12/2011 | Li .............. G01S 5/02 340/539.13 |
| 2012/0259481 A1 | 10/2012 | Kim |
| 2015/0058102 A1* | 2/2015 | Christensen ............ G11B 27/11 705/14.6 |
| 2015/0243083 A1* | 8/2015 | Coggins .................. G06T 11/00 345/633 |

FOREIGN PATENT DOCUMENTS

| | | | |
|---|---|---|---|
| DE | 102013101496 A1 * | 8/2014 | ................ B25J 3/04 |
| EP | 1967116 A1 | 9/2008 | |
| EP | 2287697 A2 | 2/2011 | |
| RU | 58423 U1 | 11/2006 | |

OTHER PUBLICATIONS

International search report received in connection with international application No. PCT/ep2015/070306, dated Nov. 16, 2015 (with English translation).

Office Action and Search Report in connection with corresponding Russian Application No. 2017111235/11, dated Apr. 23, 2019 (with English translation).

* cited by examiner

DEVICE AND METHOD FOR DETECTING CLEANING WORK WHICH HAS BEEN PERFORMED

The present invention relates to a device for simplifying the cleaning of surfaces and a method for recording the cleaning jobs performed.

One disadvantage in the performance of cleaning work is that the cleaning personnel often cannot perceive whether one or several areas have already been cleaned. When a cleaning staff member is vacuuming a floor, for example, a lack of markings, distinguishing features, or reference lines means that he or she can usually only guess exactly which areas have been already vacuumed and which areas still have to be cleaned.

This lack of markings often results in excessive overlap in certain areas or an omission to clean others during the various cleaning processes; the increased material and time expenditure results in unnecessary costs as well as potentially poor cleaning quality, or a failure to perform services owed, due to the omission of surfaces due to be cleaned.

Moreover, cleaning schedules are frequently very comprehensive, complex, ambiguous, and not sufficiently clearly structured and/or outlined, and thus cleaning personnel spend much time trying to understand them. A lack of familiarity with job duties, faulty judgment, and insufficient language skills and technical knowledge frequently result in higher costs and may cause a higher error rate. These disadvantages increase with changing performance parameters and/or premises and/or cleaning personnel.

In the prior art, cleaning processes for the cleaning of surfaces and the recording of cleaning schedules are disclosed primarily with reference to cleaning robots. In that context, the objective of cleaning robots is to treat the floor surface as completely and as quickly as possible. EP 2287697 A2, for example, discloses random navigation methods that do not require preparation or use of a map of the surroundings of the area to be cleaned. This means that no location information is used with respect to obstructions, floor area boundaries, cleaned/non-cleaned regions, etc.

Alternatively, cleaning robots prepare a map of the surroundings for targeted path planning and targeted cleaning of the floor surface, using a so-called localization and mapping algorithm. For this, a map and the position of the robot on the map are determined by means of sensors.

With such systems, the user is normally not provided with map-based information (e.g. which areas were cleaned and how) and the user has no influence on how the map is used internally.

Alternatively, permanently stored maps are also known. In EP 1 967 116 A1, for example, the degree of soiling of a floor area is ascertained and stored in the map so as to adapt the intensity of cleaning accordingly in subsequent cleaning cycles. In U.S. Pat. No. 6,667,592 B2, a stored permanent map is used to assign different functions (e.g. vacuuming, wiping) to individual area segments of a map, which can then be autonomously handled by a cleaning device. US 2011/0264305 describes a method in which a cleaning robot transmits a map related to the area to be cleaned to an external device, and in this manner permits interaction with the user.

The cleaning processes known from the prior art therefore refer to autonomous cleaning devices that independently perform cleaning cycles. Even though an optimization of the cleaning time is desirable, extended cleaning times usually generate only minor costs, and thus overlapping cleaning cycles are generally preferable in order to achieve an optimal cleaning process.

One disadvantage of the known methods, however, is that they generally do not assist cleaning personnel during the cleaning of surfaces, but instead exclusively disclose methods for autonomous robots. Another disadvantage is the inability to ascertain whether cleaning has actually occurred. Although it is generally known that the paths cleaning robots have traversed are recorded, such travel paths presently cannot be recorded for other cleaning devices, particularly manually operated vacuum cleaners, cleaning cloths, and the like, nor is it possible to determine which surfaces have actually been cleaned and on which surfaces the cleaning devices were simply moved around without actually cleaning.

The problem of the present invention is therefore to overcome the disadvantages of the prior art and in particular to provide a device that reduces the required cleaning time while maintaining an optimal cleaning result.

This problem is solved by a device, particularly one that is detachable, connectable, or connected with a cleaning device, wherein the device comprises at least one sensor means in order to record the position of at least one cleaning area of the cleaning device that can be or is used for cleaning, at least one display device, and at least one data processing unit that interacts or can be made to interact functionally with the display device and with the at least one sensor means, wherein the data processing unit is configured and adapted to display at least one representation of at least one surface to be cleaned in at least one first color, or without color and, based on a recorded change in position of at least the cleaning area of the cleaning device, to indicate the surface to be cleaned in at least one second color or without superimposition of color, wherein the at least one sensor means records or can record a contact pressure exerted on the surface to be cleaned, said pressure being exerted by the at least one area of the cleaning device that can be or is used for cleaning, wherein in particular at least one threshold value can be or is determined for the contact pressure, and wherein the surface to be cleaned can be or is displayed in at least one first color, and/or one further color, only when the threshold value is reached and/or exceeded with a recorded change of the position of at least the area used or usable for cleaning, and/or the at least one sensor means records or can record the distance of the outlet of a jet nozzle of a cleaning device from the surface to be cleaned, the angle of the outlet of the jet nozzle or of the jet to the surface to be cleaned, and the width and the strength of the jet, wherein in particular at least one threshold value of the strength of the jet on the surface can be or is determined, and wherein the surface to be cleaned is or can be displayed in at least one first color, and/or one further color, only when the threshold value is reached and/or exceeded with a recorded change in the position of the jet nozzle.

Within the context of the present invention, a color is to be understood as a highlighting or identification, which in addition to a colored identification in the classic sense is to include any conceivable identification such as patterns, letters, numerals, and the like, either additionally or exclusively. In other words, even the superposition of hatching, shading, diagonal lines, etc., on a surface is to be understood in the present context as a representation in a first, second or further color.

The strength of a jet may be understood, for example, as the volume of a cleaning agent, e.g. water, cleaning solution, dry ice, etc., per unit of time relative to the jet nozzle aperture cross-section.

A cleaning device according to the present invention can be a cleaning cloth, a vacuum cleaner, a high pressure cleaner, a polishing machine, a guided cleaning machine, and the like, for example. In the case of at least one cleaning area that can be or is used for cleaning, this area can, for example, be the suction foot of a vacuum cleaner, for a cleaning wipe, or a sponge or a brush, it can be the glove fitted with sensors which holds it, for a high pressure cleaner it can be the discharge nozzle in functional interaction with the set strength and width of the jet, for a guided floor cleaning machine, it can be the cleaning and suction unit, etc.

Here the cleaning device according to the present invention always detects which device is used and/or which step of the cleaning process is currently being performed.

The surfaces to be cleaned can include, for example, entire floor surfaces, walkways, floor edge regions, tabletops, table bases, front panels of closets, top edges of closets, bathrooms, hand washbasins and the like, or portions thereof, the present list being obviously just an example and not exhaustive.

In this context, according to the invention it may be provided that a carpeted floor is initially displayed on the display device in at least one first color, such as red. For this purpose, the device according to the present invention is connected with the suction foot of a vacuum cleaner in order to document the cleaning of the carpeted floor and display it to the user. If the suction foot is now moved across the carpeted floor, this movement is recorded by the data processing unit and the cleaned area is displayed to the user in at least one second color, such as green.

According to the present invention, it can alternatively be provided that the floor is initially displayed in the at least one first color, for example, and the color is no longer displayed due to movement of the cleaning area. This can occur in such a way, for example, that a floor is displayed in red, and the red color and/or the pattern is gradually faded out when a cleaning suction foot of a vacuum cleaner is moved.

Alternatively it can also be provided that a floor is initially displayed without color, and with movement of the cleaning area is gradually displayed in the at least one second color as having been cleaned.

As already stated, the autonomous creation by a cleaning robot of maps of areas to be cleaned and/or the assignment of specific cleaning processes, e.g. wiping of a tiled floor or vacuuming of a carpeted floor, to specific areas on maps of areas to be cleaned are in principle known in the prior art. It is also possible to determine the path along which a cleaning robot has traveled in order to generate a display therefrom to indicate which area has already supposedly been cleaned. This is possible, since such cleaning robots generally register whether their cleaning device is activated.

Such automatic recording to establish whether cleaning is done when the cleaning device is activated is however not possible with manually operated cleaning devices. With a cleaning robot, adequate floor contact is always ensured, since the robot cannot move at an optional distance above the floor, and instead the actual cleaning device of the cleaning robot can be moved by the wheels of same only at a defined distance from the floor. With cleaning robots, it is therefore basically assumed that an area across which a cleaning robot has traveled has also been cleaned and that no additional sensor system is needed.

A sensor means according to the present invention, however, makes it possible to record whether the at least one area that can be or is used by the cleaning device is actually in functional interaction with the surface to be cleaned. For example, in the case in which a sensor means according to the invention is arranged at the suction foot of a vacuum cleaner, the position and the contact pressure of said suction foot on the floor can be registered in order to ensure appropriate cleaning and to use the position for changing the color of the display.

It can also be provided that the at least one sensor means according to the invention is arranged in a glove in order to record the cleaning of a surface, such as when cleaning a table, a window, or the like with a cleaning cloth, cleaning sponge, brush, or the like.

By specifying a threshold value of the contact pressure, the sensor means according to the invention thus make it possible to determine whether cleaning occurs or not and allows this information to be converted, particularly into graphical signals.

In this context, the sensor means according to the invention in particular should not be a distance-measuring instrument that exclusively records, directly or indirectly, the distance of the cleaning area of the device from the area intended to be cleaned.

At the same time, according to one embodiment, it can also be provided that the surface to be cleaned is displayed in at least one first color and, depending on a recorded change of the position at least of the cleaning area of the cleaning device, the surface to be cleaned is displayed in at least one second color, and depending on a recorded change of the position of at least the cleaning area of the cleaning device, the surface to be cleaned is displayed in at least one further color and/or the surface to be cleaned is displayed in at least one further color based on a date and/or a time and/or a time period after a previous change of the display color is displayed in a further color.

This may be advantageous for soiling which cannot be removed only with one pass, and instead requires more than one pass across the same position in order to remove the soiling completely and/or satisfactorily and/or in order to document multiple cleaning passes.

A specific definition of threshold values of the at least one sensor means can also be used to determine whether repeat cleaning is necessary, because the contact pressure of the at least one area of the cleaning device that is usable or used for cleaning is present, but too low.

It is possible to provide, for example, that a specific area must be vacuumed at least twice. In this case, for example, the area may initially be represented in red, the area that was cleaned once can be represented in a color with a red content of 70% and a green content of 30%, and the area that was cleaned twice as desired can be represented completely in green.

This can also be advantageous for surfaces requiring at least two different cleaning passes to obtain the desired cleaning result (e.g. 1. wet wiping with a blue cloth, 2. streakless dry wiping with a green cloth) or when vacuuming a floor, where the more highly frequented areas, e.g. walkways, would have to be cleaned more intensively due to greater soiling or the expectation of greater soiling occurring there.

At the same time, it is also possible to provide that an area to be cleaned is displayed in a further color after a predetermined time, following a cleaning, in order to document that the cleaning was done as planned, although said area may have been re-soiled because of subsequent use. For example, a floor surface may have been clean prior to commencement of business but said surface may already have been re-soiled two hours after the commencement of business. By marking such a surface in a further color, for instance in yellow, this condition can be documented and represented (cleaned as planned, but soiling is to be expected due to use and/or dust accumulation).

According to one embodiment of the present invention, it is possible to provide that the device is connectable or connected with the cleaning device by means of a connection element, in particular by means of a hook and loop fastener, a zipper, an adhesive joint connection, snap fasteners, a screw connection, a clamp connection, and/or bonding.

The number of devices can be significantly reduced during cleaning by such a connection element because a separate device according to the invention is not required for each cleaning device, instead said devices can be connected with a desired cleaning device if required.

Alternatively, the device according to the invention can obviously be integrated or is integratable directly into a cleaning device.

During the use of the device according to the invention on different cleaning devices, it is advantageously possible to detect and display at any time to which cleaning device said device according to the invention is currently attached and/or which cleaning process it is currently performing, as well as the purpose thereof. This can be done in particular by an input on the device according to the invention, with which a specific cleaning device is selected or is selectable. However, it can also or alternatively be provided, for example, that different sensor means can be used for different cleaning devices. For that purpose, either an identical sensor means with a specific identification, which corresponds with one type of cleaning device, can be used and/or different types and/or assemblies of sensor means can be used for different cleaning devices.

According to one embodiment of the present invention, it can also be provided that the cleaning device and/or the cleaning process is recordable or recorded automatically by a detection means, in particular by means of a camera, which interacts or can be made to interact functionally with the data processing unit.

This can have the particular advantage of preventing manual input errors. According to the prior art, it is possible to differentiate different objects unambiguously from each other and assign them by means of known image processing algorithms.

According to the invention, it can be advantageous in this context that the registered cleaning device is shown to the user optionally for confirmation purposes, and the user confirms the correct identification of the registered cleaning device. If an incorrect cleaning device is registered, a list of possible alternative cleaning devices can be displayed.

It can also be provided that the operating conditions of the cleaning device are recorded by the device according to the invention. This can include, for example, the detection of whether a cleaning device is in operation during the movement of the cleaning area and the operating mode in which it is operated.

Advantageously, the color display according to the invention changes only if a cleaning device is in an operating condition that permits cleaning.

For example, a vacuum cleaner must be switched on and indicate an appropriate contact pressure and a movement, whereas a switched off vacuum cleaner or a switched on vacuum cleaner that does not indicate an appropriate contact pressure and/or a movement will not cause a color change of the display.

Likewise, no color change is indicated, for example, if the vacuum cleaner is switched on and the floor nozzle is in motion, but the appropriate contact pressure of the floor nozzle against the surface to be cleaned is not present.

For this purpose, it can also be provided that the at least one sensor means is a laser range scanner, odometric sensors, contact sensors and/or acceleration sensors configured and adapted in order to perform a triangulation by means of camera and laser and/or with radar or infrared. It can moreover be provided that a height sensor measures the height of a surface to be cleaned. Some surfaces to be cleaned are located at heights that can be reached only with extra effort (ladder, elevated platform, lifting platform), which can greatly increase the complexity as well as the associated costs, even if the cleaning is not complicated.

Such sensors may, on the hand, enable detection of the position of the device according to the invention and/or of the cleaning area and, on the other hand, they may optionally enable monitoring of the correct use of the cleaning area.

For this purpose, according to the invention it can be advantageous for the device to include a camera, and for the data processing unit to calculate the representation of the at least one surface to be cleaned based on the data of the camera and/or, based on the data of the camera, to display the at least one surface to be cleaned with the at least one first color and/or the at least one second color superposed on the at least one display device.

The camera furthermore detects the different colors of the cleaning cloths and/or equipment (color coding), for example, and can accordingly register whether the correct cloths are used according to color and in the correct sequence and for the correct surface (e.g. red=sanitary (dry), blue=inventory (wet), green=inventory (dry), yellow=glass surfaces (wet)).

The use of such a camera enables a colored superposition of the surfaces to be cleaned according to the invention, in particular even without floor space plans or in the event of deviations from existing plans. For example, a table can be relocated within a room, some items may lie on a writing desk, etc.

It is also possible to dispense with floor plans, for example if a floor area, a surface of a furniture item, and/or window surfaces and the like are automatically detected and superposed with color by means of known software algorithms from the prior art.

According to one embodiment of the invention, it can be provided that the at least one display device is provided in the form of a mobile terminal device, in particular a notebook, a netbook, a smartphone, a tablet PC, and/or data glasses, preferably data glasses with an integrated camera.

It can also be provided that the display device displays the surface to be cleaned in the at least one first color and/or the at least one second color together with a current view of a user of the device in the form of an augmented reality.

This particularly has the advantage that a current view of a room, of an external area, of a furniture item or the like can be directly superposed.

One advantage emerges particularly clearly when using data glasses with an integrated camera. When a cleaning staff member puts on the data glasses, the person's current view is directly overlain by colored superimposition of the surfaces scheduled to be cleaned, and therefore not only the cleaning jobs to be done, particularly in the designated sequence, but also the performance of the cleaning is documented.

Within a room, for example, it is possible to indicate at a first timepoint that the room must be vacuumed, in particular by marking the floor in red. As the floor is being vacuumed, it is gradually colored green, thus preventing areas from either being cleaned twice or not being cleaned at all because these appear red, irrespective of the direction and/or angle from which the surface is viewed via the mobile terminal device or via the camera/screen located there.

At a further timepoint, the furniture or part of the furniture or the windows may also be highlighted red so that their cleaning can also be indirectly assigned.

If cleaning is performed by a team, each team member can see instantly which jobs were already completed and which are still pending. A supervisor can also easily monitor the cleaning, since any areas still having the first color are directly displayed.

The working hours of the cleaning personnel can therefore also be distributed optimally, even if the job is carried out by a team, and follow-up monitoring, either by humans or by a software program in response to or in functional interaction with the hardware being used, is simplified.

In this context, according to the invention it can be provided that a storage device of the data processing unit includes a location profile, which can be selected by means of an input device of the data processing unit and/or is automatically selected based on a position determination of the data processing unit, preferably by means of GPS, WLAN location, GPRS triangulation and/or Bluetooth, wherein the location profile includes in particular any surfaces to be cleaned in a building, a ship, a train, an aircraft, and/or an outside area.

This means that a cleaning staff member carrying out a cleaning task can either view an automatic display of the jobs to be done or can view a display after the input of his/her position.

Advantageously, it can also be provided that the at least one display device is configured and adapted to display directional arrows in the room based on the user position, the location profile, and particularly the current orientation of the display device, which directional arrows point in the direction of surfaces to be cleaned that are not displayed.

Some cleaning jobs to be performed are located in multiple rooms or at locations situated outside the field of view, for instance the cleaning of an elevated top surface (e.g. a storage shelf above eye level) or within a locked cabinet, or jobs that have to be carried out at such great distance that they must initially be approached up to a specific distance so that the location can be detected or registered by the cleaning staff member or by the camera (e.g. small items or areas thereof). Such types of cleaning jobs can be indicated by superimposition of directional arrows.

It can also be provided that the data processing unit is configured and adapted to respond to a user input on the input device and to display additional information with regard to a selected surface to be cleaned.

According to the invention, in this context the input device can respond, as it were, to voice commands such as "material" to display suitable cleaning material, or "clip" to show a video of the cleaning to be performed.

This has the advantage that cleaning instructions for specific objects or surfaces can be displayed directly, even in several languages. Apart from text, this can also include an image, an animation, a video, and/or an audio file to explain the cleaning process to be performed in detail or in greater detail.

According to the invention, it can also be provided that the data processing unit is configured and adapted to identify a specific user, in particular through a user input by means of the input device and to display the surfaces to be cleaned based on the identified user in the at least one first color, in the at least one second color, in at least one pattern and/or not superposed with color.

This can be particularly helpful when cleaning is performed by a team, so that certain tasks can be assigned to specific cleaning staff members. By identifying individual persons, the working hours and, by follow-up checks, the workmanship of individual cleaning staff members can also be recorded.

According to the invention, it can be preferable that the at least one display device, the at least one input device, and/or the at least one sensor means communicate wirelessly with the data processing unit, in particular via Bluetooth, a radio link and/or WLAN.

This permits, for example, wireless data transfer between parts of the device according to the invention attached to the cleaning device, the display device, the input device, and/or the data processing unit, and therefore facilitates their application.

It can also be provided that the dimensions of the cleaning area of the cleaning device are storable and/or are stored and/or can be input, and the display of the representation of the at least one surface to be cleaned is carried out section by section based on the change in the position of at least the cleaning area of the cleaning device in the at least one second color based upon the dimension of the cleaning area.

This means that cleaning with a hand-held vacuum cleaner, for example, causes coloration of smaller areas than when cleaning with a suction foot of a larger vacuum cleaner. In the case of jet cleaning equipment, for example, the cleaning area is defined by the space between the jet nozzle outlet and the surface to be cleaned, the angle of the outlet of the jet nozzle or of the jet relative to the said surface, i.e. the jet direction, the jet width, and the strength of the jet.

According to the invention, it can be provided that the user and/or a further user can update the location profile by an input and/or that the location profile is automatically updated by registration of soiling, particularly when color deviations are registered by means of the camera.

Such an input can be made by means of a further electronic device and/or interactively. For example, a user can manually draw a circle around soiling, damage and/or a surface and thus mark them, and the location is registered in particular automatically. This can be a recent soiling, for example, the cleaning of which is to be assigned, or a soiling that cannot be removed (with the means at the disposal of the user) or a new surface that is to be incorporated into the cleaning plan.

According to the invention, it can also be provided that the device interacts or can be made to interact functionally with a server, and the location profile of the data processing device and the server is synchronized or synchronizable.

According to the invention, it can furthermore be provided that the data processing unit is configured and adapted to store cleaning data that include the position of at least the cleaning area of the cleaning device, a timepoint or time period, a first parameter representative for a user and/or a second parameter representative for a cleaning device, wherein these data in particular are synchronized or synchronizable with a server and/or with a further data processing unit and/or data storage device.

According to the invention, it can also be provided that the cleaning data are displayable or displayed to a user on a display device that is in functional interaction with the at least one server, particularly in the form of a display, preferably a display that is or can be connected either directly or indirectly by means of a further data processing unit, for example in the form of a computer, tablets, mobile telephones, or the like.

Such a registration of the cleaning data is associated with a number of advantages. By registration and transmission of the cleaning data to a server, the actual cleaning jobs performed can be "recorded" in real time. At the same time, the jobs performed and the associated costs can be recorded and represented in real time. Using the cleaning data, the working hours and labor cost of a cleaning staff member can thus be recorded on the one hand, and on the other hand, at the same time, or alternatively the billing for the work done can be carried out based upon the jobs that were actually done. Frequently, additional tasks are performed, due to unforeseen soiling, for example, which at present can be recorded only manually, which is costly. As with software for the calculation of telephone calls, SMS, MMS, data volume, etc. of a specific mobile telephone user, depending on location, day, time, tariff, etc., the device according to the invention similarly enables the recording and billing of the work performed according to aforementioned and work specific criteria in real time. Calculations, access to intermediate costs, and billing can therefore be done accurately, since the device according to the invention permits the type of service performed by a specific person, at what time and location, and at what labor rate, including the types of resources used, to be recorded in a database on a server.

Alternatively, it is also conceivable that instead of a server, all data are recorded and stored in the data processing unit of the device according to the invention, where they are evaluated directly, or alternatively by another data processing system, which interacts or can be made to interact functionally with the device according to the invention, without interposing a server.

By virtue of the record, moreover, the itemization of services can be presented graphically and in written format at any time, like a detailed cost itemization in a telephone bill. The cleaning data can also be used for the compilation of exact statistics and billing, and thus in particular the customized and automatic preparation of billing statements.

Ultimately, it can be advantageous that the device according to the invention is not an autonomous cleaning device, in particular not a cleaning robot.

The invention also provides for using the device according to the invention with a vacuum cleaner, a glove, a floor polishing machine, a steam cleaner, a high-pressure cleaner, and/or a window cleaning device.

The present invention is obviously not limited to the cleaning devices explicitly cited, instead these are obviously to be understood as examples. In principle, according to the invention, it is provided that a device according to the invention may be used with any desired cleaning device.

Further features and advantages of the invention can be derived from the subsequent description, which provides details of exemplary embodiments of the invention with reference to schematic drawings, without thereby limiting the invention.

DRAWINGS

Figure 2:
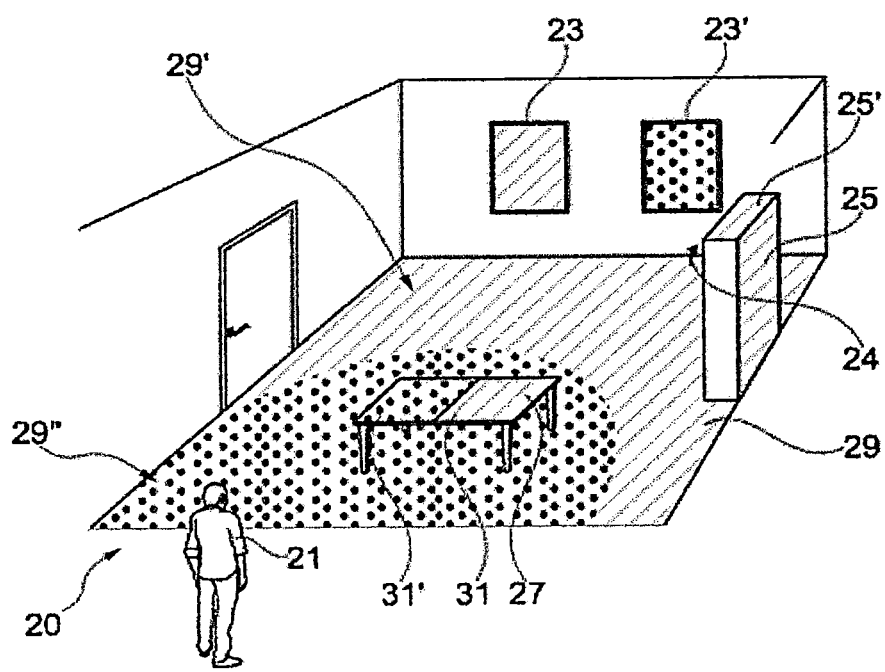

FIG. 1: shows a schematic lateral view of a device according to the invention and its functional connection with a vacuum cleaner; and FIG. 2: is a schematic perspective view of a room on a display device according to the invention.

FIG. 1 shows a schematic lateral view of a device 1 according to the invention. This device includes a sensor means 3 and a data processing unit 5. The sensor means 3 here is attached to the suction foot 7 of a vacuum cleaner 9 and registers the position of the suction foot as well as a contact or a contact pressure.

In this context, data from the data processing device 5 are transmitted to the data glasses 11, and the data processing device 5 in this case uses augmented reality data in the form of a camera 13, which is arranged on the data glasses 11, in order to superpose additional information into the current view of the user.

For this purpose, the data glasses 11 communicate wirelessly and continuously with the data processing unit 5 and register via the sensor means 3 whether the part which performs the cleaning, in this case the suction foot 7, has sufficient contact pressure with the floor, i.e. whether the at least one sensor means has adequate contact pressure greater than or equal to the threshold value, and whether and how fast the suction foot 7 moves. This movement is displayed to the user in real time on the data glasses 11 by transition of the at least one first color to the at least one second color and therefore the movement of the suction foot 7 is stored. This representation in the data glasses 11 is presented for example to the user as if a floor originally superposed with red coloration is gradually being covered with green. For this purpose, the width of the colored marking corresponds to the width of the cleaning part of the suction foot and the length of the path traveled.

The changes of the colored superimposition are maintained up to the point when the status is changed or when a change is due, so that the user can recognize exactly where cleaning has been performed. As a result, cleaning is possible close to the edges with little overlapping. In the case of multiple cleaning processes according to the invention, the color transition from the first to the second color can occur by means of multiple intermediate colors, with for example a transition from red (not cleaned) to green (cleaned) being carried out by multiple cleaning in this case. Only when the surface to be cleaned appears completely green does the user receive a display that the surface just worked on is completely cleaned.

FIG. 2 shows a schematic perspective view of a room 20 on a display device according to the invention. The actual device according to the invention is not shown in FIG. 2. In the schematic representation of FIG. 2, a user 21 sees a room with colored superimpositions. A first window 23 is already cleaned, for example, and represented in a second color, whereas a further window 23' is still to be cleaned and is therefore still represented in the first color. A directional arrow 24 points to an upper surface 25' of a cabinet 25, which upper surface 25' is not visible from the user's perspective. The floor area 29 has already been partly cleaned, in particular in the area of the table 27, which is displayed by coloration in a second color 29". The further area 29' of the floor 29 has not yet been cleaned and is therefore represented again in the first color.

The table 27 has also already been partially cleaned in area 31, while the area 31' must still be cleaned.

As clearly shown by FIG. 2, it is possible to indicate to a cleaning staff member by simple means, by superimposing on surfaces to be cleaned at least one first color and, following cleaning, by superimposing at least a second color, which cleaning tasks are still to be performed and which are already completed.

The features of the invention disclosed in the above description, in the claims, and in the drawings can be essential both individually as well as in any combinations for the realization of the invention in its different embodiments.

The invention claimed is:

1. A system for cleaning surfaces and recording the cleaning of surfaces, the system comprising:
   a motion sensor to record the position of a cleaning device for cleaning surfaces as it moves and cleans;
   a display device, wherein the display device is provided in the form of a mobile terminal device with an integrated camera;
   a data processing unit configured to functionally interact with the motion sensor and the display device;
   wherein the data processing unit is configured to display via the display device to a user of the cleaning device at least one representation of at least one cleaning surface showing what cleaning surface has already been cleaned and what is not yet cleaned, wherein the surface to be cleaned is displayed in at least one first color or at least one second color, depending on a recorded change of the position of the cleaning device, together with a current view of the user of the cleaning device in the form of an augmented reality,
   wherein the cleaning device operates with use of a contact pressure on the cleaning surface, and the system further comprises a sensor to measure the contact pressure of the cleaning device,
   wherein in determining whether the cleaning surface has already been cleaned, a threshold value of contact pressure must be met.

2. The system of claim 1, wherein the system further comprises the cleaning device.

3. The system of claim 1, wherein the mobile terminal device comprises a notebook, a netbook, a smartphone, a tablet PC, and/or data glasses.

4. The system of claim 1, wherein the mobile terminal device comprises data glasses.

5. The system of claim 1, wherein the motion sensor and the data processing unit are adapted to be connected to the cleaning device.

6. The system of claim 1, wherein the motion sensor and the data processing unit are adapted to be connected to the cleaning device with use of a hook and loop fastener, a zipper, an adhesive connection, snap fasteners, a screw connection, a clamp connection, and/or bonding.

7. The system of claim 1, wherein the motion sensor is a laser range scanner, an odometric sensor, a contact sensor, and/or an acceleration sensor, wherein the motion sensor is also adapted to perform a triangulation with use of a camera and laser.

8. The system of claim 1, wherein the data processing unit is adapted to identify a specific user.

9. The system of claim 1, wherein the dimensions of a cleaning area of the cleaning device can be stored or can be input in the data processing unit.

10. The system of claim 1, wherein the system is not an autonomous cleaning device.

11. The system of claim 1, wherein the system is not a cleaning robot.

12. The system of claim 1, wherein the cleaning device is a vacuum cleaner, a glove, a floor cleaning machine, a steam cleaner, a high-pressure cleaner, a padholder, and/or a window cleaning device.

13. A method comprising cleaning a surface using the system of claim 1.

* * * * *